United States Patent
Asai

(10) Patent No.: US 10,851,726 B2
(45) Date of Patent: Dec. 1, 2020

(54) CONTROL DEVICE FOR INTERNAL COMBUSTION ENGINE AND CONTROL METHOD FOR INTERNAL COMBUSTION ENGINE

(71) Applicant: Yanmar Co., Ltd., Osaka (JP)

(72) Inventor: Go Asai, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 52 days.

(21) Appl. No.: 16/316,556

(22) PCT Filed: Jun. 29, 2017

(86) PCT No.: PCT/JP2017/024049
§ 371 (c)(1),
(2) Date: Jan. 9, 2019

(87) PCT Pub. No.: WO2018/012309
PCT Pub. Date: Jan. 18, 2018

(65) Prior Publication Data
US 2019/0293012 A1    Sep. 26, 2019

(30) Foreign Application Priority Data

Jul. 14, 2016 (JP) ................................ 2016-139576

(51) Int. Cl.
*F02D 41/00* (2006.01)
*F02D 19/06* (2006.01)
(Continued)

(52) U.S. Cl.
CPC ..... *F02D 41/0085* (2013.01); *F02D 19/0623* (2013.01); *F02D 19/0642* (2013.01);
(Continued)

(58) Field of Classification Search
CPC ............ F02D 41/0025; F02D 41/0027; F02D 41/008; F02D 41/0082; F02D 41/0085;
(Continued)

(56) References Cited

U.S. PATENT DOCUMENTS

| 4,131,095 A | 12/1978 | Ouchi |
| 6,694,960 B2 * | 2/2004 | Hess ..................... F02D 35/023 |
| | | 123/436 |

(Continued)

FOREIGN PATENT DOCUMENTS

| JP | 2007332891 A | 12/2007 |
| JP | 2009-197730 A | 9/2009 |

(Continued)

OTHER PUBLICATIONS

English Machine Translation of JP2019-197730 provided by J-Plat (Year: 2020).*

(Continued)

*Primary Examiner* — Jacob M Amick
*Assistant Examiner* — Michael A Kessler
(74) *Attorney, Agent, or Firm* — Norton Rose Fulbright US LLP

(57) ABSTRACT

An internal combustion engine in which an output from a fuel reformation cylinder is obtained based on a cylinder internal pressure and a rotational speed of the fuel reformation cylinder, and an output adjusting operation for adjusting an output from an output cylinder is executed so that a sum of the output from the fuel reformation cylinder and the output from the output cylinder matches with a required engine power. In this output adjusting operation, during a transient operation in which the required engine power is increased, the output from the output cylinder is increased by increasing the fuel supply amount to a combustion chamber. Then, the fuel supply amount to a fuel reformation
(Continued)

chamber is gradually increased while the fuel supply amount to the combustion chamber is gradually reduced, so that a heat source is shifted from the fuel to the reformed fuel.

19 Claims, 5 Drawing Sheets

(51) Int. Cl.
    *F02D 41/04*      (2006.01)
    *F02M 27/02*      (2006.01)
    *F02M 26/36*      (2016.01)
    *F02D 19/10*      (2006.01)

(52) U.S. Cl.
    CPC ..... *F02D 19/0644* (2013.01); *F02D 19/0671* (2013.01); *F02D 19/10* (2013.01); *F02D 41/0025* (2013.01); *F02D 41/0027* (2013.01); *F02D 41/04* (2013.01); *F02M 26/36* (2016.02); *F02M 27/02* (2013.01); *F02D 41/008* (2013.01); *F02D 41/045* (2013.01); *F02D 2200/1002* (2013.01)

(58) Field of Classification Search
    CPC ............. F02D 19/0642; F02D 19/0644; F02D 19/0671; F02D 19/081; F02D 2200/1002; F02D 2200/1004; F02M 26/36; Y02T 10/36
    USPC .................................................. 123/3; 60/285
    See application file for complete search history.

(56) References Cited

U.S. PATENT DOCUMENTS

| | | | | |
|---|---|---|---|---|
| 2010/0037873 | A1* | 2/2010 | Jung | F02D 41/1498 |
| | | | | 123/568.21 |
| 2010/0206249 | A1* | 8/2010 | Bromberg | F02D 19/0671 |
| | | | | 123/3 |
| 2012/0031353 | A1* | 2/2012 | Pursifull | F02M 27/02 |
| | | | | 123/3 |
| 2015/0252742 | A1* | 9/2015 | Stroh | F02N 11/0814 |
| | | | | 60/274 |
| 2017/0284315 | A1* | 10/2017 | Asai | F02M 33/00 |
| 2019/0226410 | A1* | 7/2019 | Asai | F02B 43/04 |
| 2019/0234354 | A1* | 8/2019 | Asai | F02D 41/0065 |
| 2019/0249626 | A1* | 8/2019 | Asai | F02B 51/02 |
| 2019/0293012 | A1* | 9/2019 | Asai | F02D 41/0027 |
| 2019/0301382 | A1* | 10/2019 | Asai | F02B 75/18 |

FOREIGN PATENT DOCUMENTS

| | | |
|---|---|---|
| JP | 2013-092137 A | 5/2013 |
| JP | 2014-101772 A | 6/2014 |
| JP | 2014-136978 A | 7/2014 |
| JP | 2016-070101 A | 5/2016 |
| JP | 2016094930 A | 5/2016 |
| WO | 2016-035735 A1 | 3/2016 |

OTHER PUBLICATIONS

Japanese Office Action dated Nov. 19, 2019 issued in corresponding JP Application 2016-139576.
European Search Report dated Jun. 6, 2019 issued in corresponding EP Application 17827439.5.
International Search Report dated Sep. 19, 2017 issued in corresponding PCT Application PCT/JP2017/024049.

* cited by examiner

CONTROL DEVICE FOR INTERNAL COMBUSTION ENGINE AND CONTROL METHOD FOR INTERNAL COMBUSTION ENGINE

CROSS REFERENCES TO RELATED APPLICATIONS

This application is a national stage application pursuant to 35 U.S.C. § 371 of International Application No. PCT/JP2017/024049, filed on Jun. 29, 2017 which claims priority under 35 U.S.C. § 119 to Japanese Patent Application No. 2016-139576 filed on Jul. 14, 2016, the disclosures of which are hereby incorporated by reference in their entireties.

TECHNICAL FIELD

The present invention relates to a control device for an internal combustion engine and a control method of an internal combustion engine. In particular, the present invention relates to a control device and a control method applied to an internal combustion engine including a fuel reformation cylinder capable of functioning as a fuel reformation device.

BACKGROUND ART

Traditionally, there has been known an internal combustion engine having a fuel reformation cylinder and an output cylinder (e.g., Patent Literature 1, hereinafter, PTL 1). This type of internal combustion engine reforms fuel in a fuel reformation cylinder. Then, the fuel after reformation (hereinafter, reformed fuel) is combusted in the output cylinder to obtain an engine power.

Specifically, a fuel such as light oil or heavy oil is supplied to the fuel reformation cylinder, and an air-fuel mixture having a high equivalence ratio is adiabatically compressed within the fuel reformation cylinder. As a result, the fuel is reformed under a high temperature and high pressure environment, and a reformed fuel (fuel with a high octane value) having a high anti-knock property such as hydrogen, carbon monoxide, and methane is generated. This reformed fuel is then supplied to the output cylinder together with the air, and the lean mixture is combusted (uniform lean combustion) in the output cylinder, to yield an engine power.

With this type of internal combustion engine, uniform lean combustion is performed in the output cylinder. The NOx emission amount and the soot discharge amount can therefore be reduced. Further, since a fuel with a high anti-knock property is combusted, knocking is suppressed or reduced, and since diesel micro-pilot ignition (ignition of reformed fuel by supplying a small amount of fuel into the output cylinder) enables combustion at a suitable timing, the combustion efficiency can be also improved.

CITATION LIST

Patent Literature

PTL 1: Japanese Patent Application Laid-Open No. 2014-136978

SUMMARY OF INVENTION

Technical Problem

To generate reformed fuel in the fuel reformation cylinder as described above, the conversion efficiency can be increased by increasing the equivalence ratio in the fuel reformation cylinder.

However, increasing the equivalence ratio in the fuel reformation cylinder reduces the amount of the oxidation reaction (combustion amount) in the fuel reformation cylinder. Since this oxidation reaction contributes to torque, reducing the amount of oxidation reaction by increasing the equivalence ratio leads to reduction in the torque (output) generated in the fuel reformation cylinder. Since the reforming reaction in the fuel reformation cylinder involves an endothermic reaction, the torque from the fuel reformation cylinder may be a negative value depending on the operating condition of the fuel reformation cylinder. That is, the fuel reformation cylinder may be driven by the torque from the output cylinder.

In such an operational state, the fuel reformation cylinder needs to be driven while a required engine power according to a load or the like is satisfied. Therefore, a torque according to the required engine power needs to be output from the output cylinder.

Further, the reforming reaction in the fuel reforming cylinder depends on the equivalence ratio and the gas temperature (particularly, a compression end gas temperature when the piston reaches the compression top dead point) in the fuel reformation cylinder. When the equivalence ratio approaches (drops to) 1, an amount of the oxidation reaction increases, thus making the torque generated in the fuel reformation cylinder a positive value. Further, the magnitude of the torque varies depending on the temperature conditions such as the gas temperature and the like, as well as the equivalence ratio.

Therefore, in such an operational state, the torque output from the output cylinder needs to be adjusted so that the output of the entire internal combustion engine (the sum of the output from the fuel reformation cylinder and the output from the output cylinder) becomes the required engine power.

To date, there has been no specific proposed method for adjusting an output of the output cylinder according to the operational state of the fuel reformation cylinder in an internal combustion engine including the fuel reformation cylinder and the output cylinder.

The present invention is made in view of the above problems, and it is an object of the present invention to provide a control device and a control method for an internal combustion engine having a fuel reformation cylinder and an output cylinder, the control device and the control method capable of stably yielding an engine power of a value nearby the required engine power, by adjusting the output of the output cylinder according to the operational state of the fuel reformation cylinder.

Solution to Problem

A solution of the present invention to achieve the above-described object premises a control device to be applied to an internal combustion engine including a fuel reformation cylinder capable of serving as a fuel reformation device and one or more output cylinders to which reformed fuel generated in the fuel reformation cylinder is supplied, the one or more output cylinders each configured to yield an engine power by combusting the reformed fuel, the fuel reformation cylinder and the one or more output cylinders being connected in a mutually-power-transmittable manner. The control device for the internal combustion engine includes an output adjustment unit configured to evaluate an output from the fuel reformation cylinder, and execute an output adjusting operation to adjust an output from the one or more output cylinders so that a sum of the output from the fuel reformation cylinder and the output from the one or more output cylinders matches or substantially matches with a required engine power.

With this structure, when the output from the fuel reformation cylinder is a negative value, i.e., in a state where the fuel reformation cylinder is driven by the output from the output cylinder, the output adjustment unit increases the output from the output cylinder by that amount (the amount of output required for driving the fuel reformation cylinder). To the contrary, when the output from the fuel reformation cylinder is a positive value, i.e., in a state where the output from the fuel reformation cylinder contributes to the engine power, the output adjustment unit reduces the output from the output cylinder by that amount (an amount of output of the fuel reformation cylinder). Thus, the sum of the output from the fuel reformation cylinder and the output from the output cylinder can be matched or substantially matched with the required engine power. Therefore, an engine output can be stably obtained as a value nearby the required engine power, irrespective of the operational state of the fuel reformation cylinder.

Further, it is preferable that the internal combustion engine includes a plurality of output cylinders, and the output adjustment unit subtracts the output from the fuel reformation cylinder from the required engine power, divides a value resulting from the subtraction by the number of output cylinders to determine a target output for each of the output cylinders, and executes the output adjusting operation so as to obtain the target output determined.

With this structure, when the output from the fuel reformation cylinder is a positive value, the value is subtracted from the required engine power so that the target output of each output cylinder is determined as to be a relatively small value. On the other hand, when the output from the fuel reformation cylinder is a negative value, the value is subtracted from (as an absolute value, added to) the required engine power so that the target output of each output cylinder is determined as to be a relatively large value. In either case, the sum of the output from the output cylinders and the output from the fuel reformation cylinder can be matched or substantially matched with the required engine power.

Further, the output from the fuel reforming cylinder is preferably evaluated based on a cylinder internal pressure of the fuel reforming cylinder and a rotational speed of the fuel reforming cylinder, or evaluated based on a rotational speed of the fuel reformation cylinder at a time of executing reforming reaction in the reforming reaction.

By evaluating an output from the fuel reformation cylinder according to these state quantities in the internal combustion engine, an output from the fuel reformation cylinder can be evaluated with high accuracy. As a result, the output from the output cylinders can be adjusted with high accuracy.

Each of the cylinders has an injector configured to supply fuel into the cylinder. Further, it is preferable that the output adjustment unit, during a transient operation in which the required engine power is increased, increases a fuel supply amount to the or each output cylinder from its injector to increase the output from the or every output cylinder, so that a sum of output from the or every output cylinder and the output from the fuel reformation cylinder matches or substantially matches with the required engine power, and then gradually increases the fuel supply amount from the injector to the fuel reformation cylinder while gradually reducing the fuel supply amount to the or each output cylinder from its injector, so as to maintain a state in which the sum of the output from the or every output cylinder and the output from the fuel reformation cylinder matches or substantially matches with the required engine power.

The stability of operation may be impaired when an output from the output cylinder is increased by increasing the fuel supply amount to the fuel reformation cylinder (by increasing an amount of reformed fuel generated) during the transient operation in which the required engine power is increased. To address this, in the present solution, during a transient operation in which the required engine power is increased, a fuel supply amount to the or each output cylinder from its injector is increased to increase the output from the or every output cylinder, so that a sum of output from the or every output cylinder and the output from the fuel reformation cylinder matches or substantially matches with the required engine power. Thus, an engine power which matches or substantially matches the required engine power can be obtained while the stability of the operation is maintained. Then, the fuel supply amount from the injector to the fuel reformation cylinder is gradually increased and the fuel supply amount to the or each output cylinder from its injector is gradually reduced so as to shift the heat source for obtaining the output from the or every output cylinder, from the fuel directly supplied to the or each output cylinder (fuel from the injector) to the reformed fuel (reformed fuel supplied from the fuel reformation cylinder). Thus, the operational state can be shifted to the state of using the reformed fuel, while matching or substantially matching the sum of the output from the or every output cylinder and the output from the fuel reformation cylinder with the required engine power.

Further, it is preferable that a reforming reaction promoting unit configured to execute a reforming reaction promoting operation for promoting reforming reaction, when the output from the fuel reformation cylinder is a predetermined amount or more below an output supposed to be obtained when the reforming reaction is normally taking place in the fuel reformation cylinder.

For example, when controlling the fuel supply amount to the fuel reformation cylinder to match or substantially match the sum of an output from the or every output cylinder and an output from the fuel reformation cylinder with the required engine power, it will be difficult to match the sum of the outputs with the required engine power, if the reforming reaction in the fuel reformation cylinder does not normally take place. For this reason, it is preferable that the reforming reaction normally takes place. In the present solution, when the output from the fuel reformation cylinder is a predetermined amount or more below an output supposed to be obtained when the reforming reaction is normally taking place in the fuel reformation cylinder, the reforming reaction promoting operation is executed for promoting reforming reaction, assuming that the reforming reaction is not taking place normally in the fuel reformation cylinder. Thus, the control for matching or substantially matching the sum of the output from the or every output cylinder and the output from the fuel reformation cylinder with the required engine power can be favorably performed.

It is preferable that the reforming reaction promoting operation by the reforming reaction promoting unit brings the equivalence ratio in the fuel reformation cylinder close to 1 or raises the gas temperature in the fuel reformation cylinder Bringing the equivalence ratio in the fuel reformation cylinder close to 1 increases the amount of oxidation reaction in the fuel reforming cylinder, and increases the output from the fuel reforming cylinder. Further, an increase in the gas temperature in the fuel reformation cylinder makes the gas state in the fuel reformation cylinder a state that enables the reforming reaction, and the output from the fuel reformation is increased with the reforming reaction. Thus, the control for matching or substantially matching the sum of the output from the or every output cylinder and the output from the fuel reformation cylinder with the required engine power can be favorably performed.

Further, the scope of the technical thought of the present invention encompasses a control method for the internal combustion engine implemented by the control device for the internal combustion engine according to each of the above described solutions. Namely, it is premised that a control method is applied to an internal combustion engine including a fuel reformation cylinder capable of serving as a fuel reformation device and an output cylinder to which reformed fuel generated in the fuel reformation cylinder is supplied, the output cylinder configured to yield an engine power by combusting the reformed fuel, the fuel reformation cylinder and the output cylinder being connected in a mutually-power-transmittable manner. In the control method for the internal combustion engine, an output from the fuel reformation cylinder is evaluated, and an output adjusting operation is executed to adjust an output from the output cylinder so that a sum of the output from the fuel reformation cylinder and the output from the output cylinder matches or substantially matches with a required engine power.

Also by this control method, the sum of the output from the fuel reformation cylinder and the output from the output cylinder can be matched or substantially matched with the required engine power, and an engine output can be stably obtained as a value nearby the required engine power, irrespective of the operational state of the fuel reformation cylinder, as described above.

Advantageous Effects of Invention

In the present invention, an output adjusting operation for adjusting an output from an output cylinder is executed so that a sum of the output from the fuel reformation cylinder and the output from the output cylinder matches or substantially matches with a required engine power. Therefore, an engine output can be stably obtained as a value nearby the required engine power, irrespective of the operational state of the fuel reformation cylinder.

DESCRIPTION OF EMBODIMENTS

The following describes an embodiment of the present invention based on the attached drawings. The present embodiment deals with a case where the present invention is applied to an internal combustion engine for a ship.

—System Structure of Internal Combustion Engine—

Figure 1:
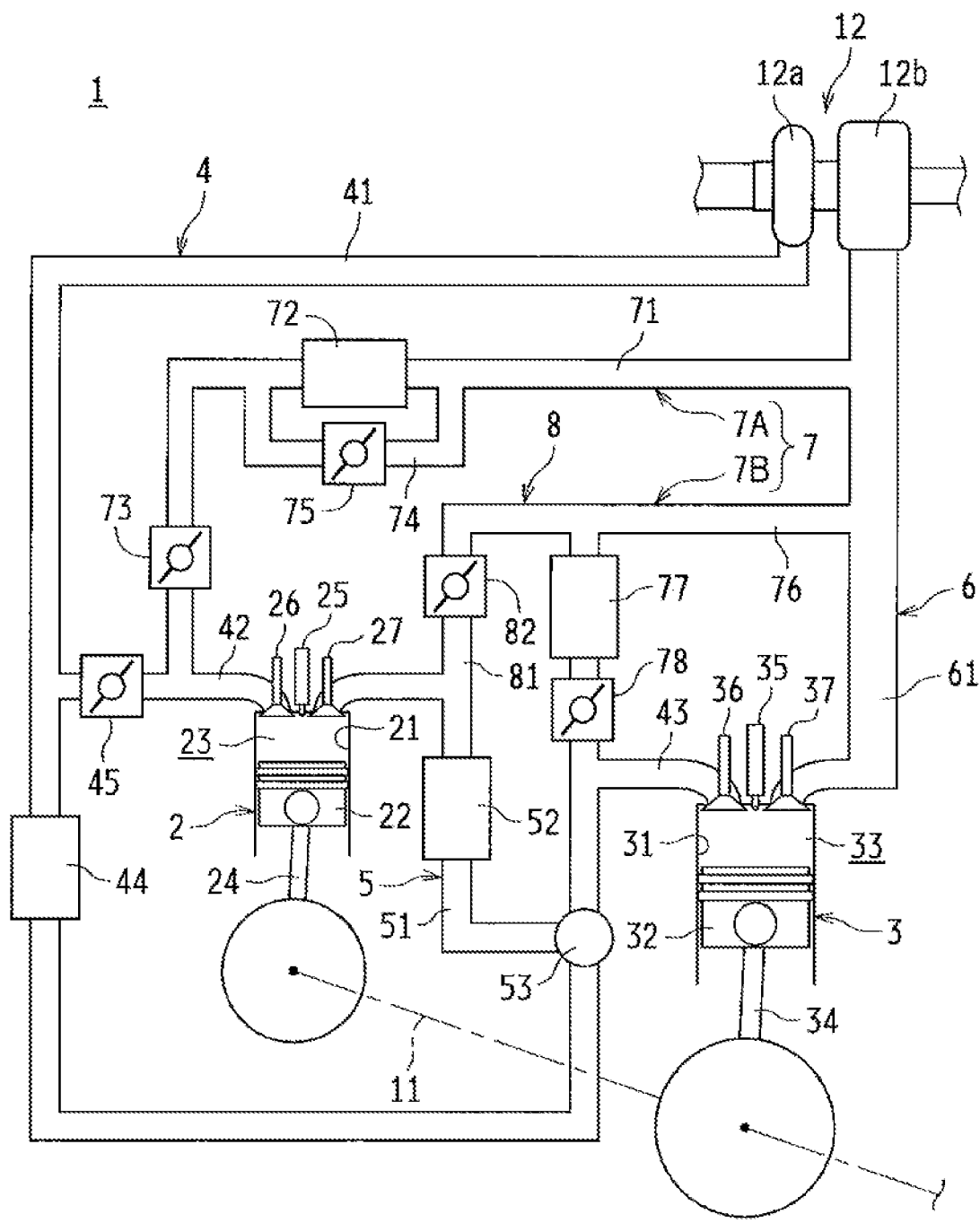
FIG. 1 A diagram showing a system structure of an internal combustion engine related to an embodiment.

FIG. 1 is a diagram showing a system structure of an internal combustion engine related to the present embodiment.

As shown in FIG. 1, the internal combustion engine 1 according to the present embodiment includes a fuel reformation cylinder 2 and an output cylinder 3. Further, the internal combustion engine 1 includes, as a piping system for supplying (introducing) gas or discharging (leading out) a gas to and from the fuel reformation cylinder 2 and the output cylinder 3, an air-intake system 4, a reformed fuel supply system 5, an exhaust system 6, an EGR system 7, and an output cylinder bypass system 8.

(Fuel Reformation Cylinder and Output Cylinder)

The fuel reformation cylinder 2 and the output cylinder 3 are both structured as a reciprocation type. Specifically, the cylinders 2, 3 have, in their cylinder bores 21, 31 formed in a cylinder block (not shown), pistons 22, 32 in such a manner as to be able to reciprocate, respectively. In the fuel reformation cylinder 2, a fuel reformation chamber 23 is formed by the cylinder bore 21, the piston 22, and a not-shown cylinder head. In the output cylinder 3, a combustion chamber 33 is formed by the cylinder bore 31, the piston 32, and a not-shown cylinder head.

The internal combustion engine 1 of the present embodiment includes four cylinders in the cylinder block, and one of the cylinders is structured as the fuel reformation cylinder 2, whereas three other cylinders are structured as the output cylinder 3. Reformed fuel generated by the fuel reformation cylinder 2 is supplied to each output cylinder 3. The numbers of the cylinders 2, 3 are not limited to the above. For example, the cylinder block may include six cylinders, and two of the cylinders are structured as the fuel reformation cylinder 2, whereas four other cylinders are structured as the output cylinder 3.

The pistons 22, 32 of the cylinders 2, 3 are connected to a crankshaft 11 through connecting rods 24, 34, respectively. This way, the motion is converted from reciprocation of the pistons 22, 32 to rotation of the crankshaft 11. The crankshaft 11 can be connected to a screw shaft of the ship through a clutch mechanism (not shown). The piston 22 of the fuel reformation cylinder 2 and the piston 32 of the output cylinder 3 are connected to each other through the connecting rods 24, 34 and the crankshaft 11. This enables power transmission between the cylinders 2, 3, transmission of output power from the cylinders 2, 3 to the screw shaft, and the like.

The fuel reformation cylinder 2 includes an injector 25 configured to supply a pre-reformed fuel such as light oil to the fuel reformation chamber 23. With supply of fuel from the injector 25, the fuel reformation chamber 23 adiabatically compresses air-fuel mixture with a high equivalence ratio. As a result, the fuel is reformed under a high temperature and high pressure environment, and a reformed fuel having a high anti-knock property such as hydrogen, carbon monoxide, and methane is generated.

The output cylinder 3 includes an injector 35 configured to supply a fuel such as light oil to the combustion chamber 33. To the combustion chamber 33, the reformed fuel generated in the fuel reformation cylinder 2 is supplied together with the air. Then, premixed combustion of the lean mixture is performed in the combustion chamber 33. This way, the crankshaft 11 rotates with reciprocation of the piston 32, and an engine power is obtained.

(Air-Intake System)

The air-intake system 4 is configured to introduce air (fresh air) to the fuel reformation chamber 23 of the fuel reformation cylinder 2 and the combustion chamber 33 of the output cylinder 3.

The air-intake system 4 includes a main air-intake passage 41. This main air-intake passage 41 is branched into two systems: i.e., a fuel reformation cylinder air-intake passage 42 and an output cylinder air-intake passage 43. The main air-intake passage 41 includes a compressor wheel 12a of a turbocharger 12. The fuel reformation cylinder air-intake passage 42 communicates with the air-intake port of the fuel reformation cylinder 2. Between this air-intake port and the fuel reformation chamber 23 of the fuel reformation cylinder 2, an air-intake valve 26 that can open/close is arranged. Further, the fuel reformation cylinder air-intake passage 42 includes an air-intake amount adjust valve 45 whose opening degree is adjustable. The output cylinder air-intake passage 43 communicates with an air-intake port of the output cylinder 3. Between this air-intake port and the combustion chamber 33 of the output cylinder 3, an air-intake valve 36 that can open/close is arranged. Further, the output cylinder air-intake passage 43 includes an intake-air cooler (inter cooler) 44.

(Reformed Fuel Supply System)

The reformed fuel supply system 5 supplies reformed fuel generated in the fuel reformation cylinder 2 to the combustion chamber 33 of the output cylinder 3.

The reformed fuel supply system 5 includes a reformed fuel supply passage 51 The reformed fuel supply passage 51 includes a reformed fuel cooler 52. An upstream end of the reformed fuel supply passage 51 communicates with the exhaust port of the fuel reformation cylinder 2. Between this exhaust port and the fuel reformation chamber 23 of the fuel reformation cylinder 2, an exhaust valve 27 that can open/close is arranged. A downstream end of the reformed fuel supply passage 51 communicates with the output cylinder air-intake passage 43. In a communicating portion between the reformed fuel supply passage 51 and the output cylinder air-intake passage 43, a mixer 53 is provided. In the mixer 53, the reformed fuel generated by the fuel reformation cylinder 2 is mixed with the air flowing through the output cylinder air-intake passage 43, and is supplied to the combustion chamber 33 of the output cylinder 3.

(Exhaust System)

The exhaust system 6 is configured to discharge exhaust gas generated in the output cylinder 3. The exhaust system 6 includes an exhaust passage 61. The exhaust passage 61 includes a turbine wheel 12b of the turbocharger 12. The exhaust passage 61 communicates with an exhaust port of the output cylinder 3. Between this exhaust port and the combustion chamber 33 of the output cylinder 3, an exhaust valve 37 that can open/close is arranged.

(EGR System)

An EGR system 7 includes a fuel reformation cylinder EGR system 7A and an output cylinder EGR system 7B.

The fuel reformation cylinder EGR system 7A is configured to direct and supply a part of exhaust gas to the fuel reformation chamber 23 of the fuel reformation cylinder 2, the exhaust gas flowing through the exhaust passage 61. The fuel reformation cylinder EGR system 7A includes a fuel reformation cylinder EGR passage 71. The fuel reformation cylinder EGR passage 71 has its upstream end communicated with the exhaust passage 61, and has its downstream end communicated with the downstream side of the air-intake amount adjust valve 45 in the fuel reformation cylinder air-intake passage 42, respectively. The fuel reformation cylinder EGR passage 71 includes an EGR gas cooler 72. On the downstream side of the EGR gas cooler 72 in the fuel reformation cylinder EGR passage 71 (in a position closer to the fuel reformation cylinder air-intake passage 42), an EGR gas amount adjusting valve 73 is provided. Further, the fuel reformation cylinder EGR system 7A is provided with a cooler bypass passage 74 for letting the EGR gas bypassing the EGR gas cooler 72. In the cooler bypass passage 74, a bypass amount adjusting valve 75 is provided.

The output cylinder EGR system 7B is configured to return a part of exhaust gas to the combustion chamber 33 of the output cylinder 3, the exhaust gas flowing through the exhaust passage 61. The output cylinder EGR system 7B includes an output cylinder EGR passage 76. The output cylinder EGR passage 76 has its upstream end communicated with the exhaust passage 61, and has its downstream end communicated with the downstream side of a mixer 53 in the output cylinder air-intake passage 43, respectively. The output cylinder EGR passage 76 includes an EGR gas cooler 77. On the downstream side of the EGR gas cooler 77 in the output cylinder EGR passage 76 (in a position closer to the output cylinder air-intake passage 43), an EGR gas amount adjusting valve 78 is provided.

(Output Cylinder Bypass System)

The output cylinder bypass system 8 is used to introduce exhaust gas from the fuel reformation cylinder 2 into the exhaust passage 61 without supplying the gas to the output cylinder 3 (i.e., by bypassing the output cylinder 3). The output cylinder bypass system 8 includes an output cylinder bypass passage 81. The output cylinder bypass passage 81 has its upstream end communicated with the upstream side of a reformed fuel cooler 52 in a reformed fuel supply passage 51, and has its downstream end communicated with the upstream side of the EGR gas cooler 77 (the side close to the exhaust passage 61) in the output cylinder EGR passage 76. Further, the output cylinder bypass passage 81 includes a bypass amount adjusting valve 82.

For the coolers 44, 52, 72, 77 provided in each of the above-described systems, engine cooling water, seawater, or the like is used as a cooling heat source for cooling the gas. Further, the coolers 44, 52, 72, 77 may be of an air-cooled type.

—Control System of Internal Combustion Engine—

Figure 2:
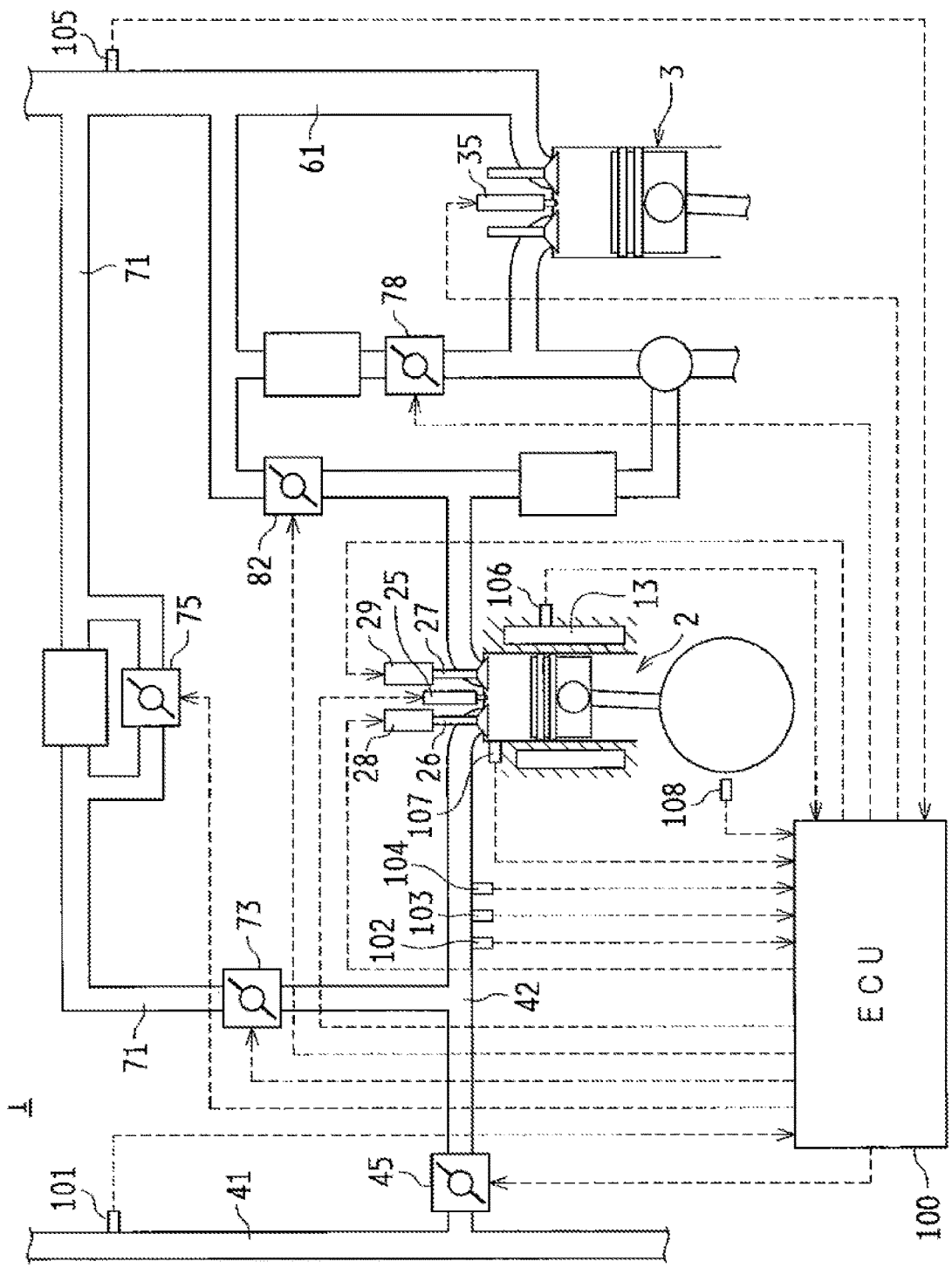
FIG. 2 A diagram showing a schematic structure of a control system of the internal combustion engine.

FIG. 2 is a diagram showing a schematic structure of a control system of the internal combustion engine 1. The internal combustion engine 1 is provided with an ECU (Electronic Control Unit) 100 serving as a control device for controlling various actuators in the internal combustion engine 1. The ECU 100 includes a CPU (Central Processing Unit), a ROM (Read Only Memory), a RAM (Random Access Memory), a backup RAM, and the like.

The ROM stores various control programs, a map which is referred to at a time of executing the various control programs, and the like. The CPU executes arithmetic processing based on the various control programs and maps stored in the ROM. Further, the RAM is a memory for temporarily storing the calculation result of the CPU and data input from various sensors. Further, the backup RAM is a nonvolatile memory which stores data and the like to be saved at a time of system shutdown and the like.

As shown in FIG. 2, the internal combustion engine 1 includes an intake-air flow sensor 101, a taken-in gas pressure sensor 102, a taken-in gas temperature sensor 103, a taken-in $O_2$ sensor 104, an exhaust pressure sensor 105, a water temperature sensor 106, a cylinder internal pressure sensor 107, a crank position sensor 108, and the like.

The intake-air flow sensor 101 transmits, to the ECU 100, an output signal corresponding to the flow rate of the taken-in air (air) flowing in the main air-intake passage 41.

The taken-in gas pressure sensor 102 transmits, to the ECU 100, an output signal corresponding to the pressure of the taken-in gas flowing in the fuel reformation cylinder air-intake passage 42. Specifically, an output signal corresponding to the pressure of the taken-in gas in the fuel reformation cylinder air-intake passage 42, on the downstream side of a portion communicating with the fuel reformation cylinder EGR passage 71 is transmitted to the ECU 100.

The taken-in gas temperature sensor 103 transmits, to the ECU 100, an output signal corresponding to the temperature of the taken-in gas flowing in the fuel reformation cylinder air-intake passage 42. Specifically, an output signal corresponding to the taken-in gas temperature of the fuel reformation cylinder air-intake passage 42, on the downstream side of a portion communicating with the fuel reformation cylinder EGR passage 71 is transmitted to the ECU 100.

The taken-in $O_2$ sensor 104 transmits, to the ECU 100, an output signal corresponding to the concentration of oxygen in the taken-in gas flowing in the fuel reformation cylinder air-intake passage 42. Specifically, an output signal corresponding to the oxygen concentration in the taken-in gas in the fuel reformation cylinder air-intake passage 42, on the downstream side of a portion communicating with the fuel reformation cylinder EGR passage 71 is transmitted to the ECU 100.

The exhaust pressure sensor 105 transmits, to the ECU 100, an output signal corresponding to the pressure of the exhaust gas flowing in the exhaust passage 61. Specifically, an output signal corresponding to the exhaust pressure of the exhaust passage 61 on the upstream side of the portion communicating with the fuel reformation cylinder EGR passage 71 is transmitted to the ECU 100.

The water temperature sensor 106 transmits, to the ECU 100, an output signal corresponding to the temperature of the cooling water flowing in the cooling water passage 13 formed in the cylinder block. Specifically, an output signal corresponding to the temperature of the cooling water flowing in the cooling water passage 13 formed around the fuel reformation cylinder 2 is transmitted to the ECU 100.

The cylinder internal pressure sensor 107 is arranged to face the fuel reformation chamber 23, and transmits an output signal corresponding to the pressure in the fuel reformation chamber 23 to the ECU 100. The pressure in the fuel reformation chamber 23 can be used for calculation of an indicated horsepower of the fuel reformation chamber 23 (an indicated horsepower caused by the reaction in the fuel reformation chamber 23).

The crank position sensor 108 is constituted by, for example, an electromagnetic pickup, and outputs, to the ECU 100, a pulse signal corresponding to a rotation position of a not-shown Ne rotor arranged so as to be integrally rotatable with the crankshaft 11 or a not-shown flywheel.

The ECU 100 is electrically connected to each of the injectors 25, 35, the adjusting valves 45, 73, 75, 78, 82, and the like. Further, the air-intake valve 26 and the exhaust valve 27 of the fuel reformation cylinder 2 are provided with variable valve units 28, 29, respectively. This way, the opening and closing timing of the valves 26, 27 can be adjusted. The ECU 100 is also electrically connected to these variable valve units 28, 29. Based on the output signals from the above described various sensors 101 to 108 and the like, the ECU 100 performs: fuel injection control of the injectors 25, 35 (opening and closing control of the injectors 25, 35); opening and closing control of the adjustment valves 45, 73, 75, 78, 82 (gas flow rate control), and opening and closing timing control of the valves 26, 27 by variable valve units 28, 29.

—Basic Operation of Internal Combustion Engine—

Next, a basic operation of the internal combustion engine 1 configured as described above will be described.

In a basic operation after completion of warming up the internal combustion engine 1 (in a state enabling a reforming reaction of the fuel in the fuel reformation chamber 23), the air introduced into the main air-intake passage 41 is pressurized by the compressor wheel 12a of the turbocharger 12. The air is then branched into the fuel reformation cylinder air-intake passage 42 and the output cylinder air-intake passage 43. At this time, the flow rate of the taken-in air flowing through the fuel reformation cylinder air-intake passage 42 is adjusted by the air-intake amount adjust valve 45. Further, the EGR gas having flown through the fuel reformation cylinder EGR system 7A is introduced into the fuel reformation cylinder air-intake passage 42. At this time, the amount of the EGR gas introduced into the fuel reformation cylinder air-intake passage 42 is adjusted by the EGR gas amount adjusting valve 73. Further, the temperature of the EGR gas introduced into the fuel reformation cylinder air-intake passage 42 is adjusted by the EGR gas amount bypassing the EGR gas cooler 72 according to the opening degree of the bypass amount adjusting valve 75. As a result, the air and the EGR gas are introduced into the fuel reformation chamber 23 of the fuel reformation cylinder 2. At this time, the flow rate of the taken-in air adjusted by the opening degree of the air-intake amount adjust valve 45, the flow rate of the EGR gas adjusted by the opening degree of the EGR gas amount adjusting valve 73, and the temperature of the EGR gas adjusted by the opening degree of the bypass amount adjusting valve 75 are adjusted so as to set a high equivalence ratio in the fuel reformation chamber 23, and to achieve a gas temperature in the fuel reformation chamber 23 that enables favorable fuel reformation. Specifically, the opening degrees of the air-intake amount adjust valve 45, the EGR gas amount adjusting valve 73, and the bypass amount adjusting valve 75 are set so that the equivalence ratio in the fuel reformation chamber 23 at the time of supplying the fuel from the injector 25 to the fuel reformation chamber 23 is, for example, 2.5 or more (preferably, 4.0 or more) and the gas temperature of the fuel reformation chamber 23 is at least a lower limit value of a reforming reaction enabling temperature, according to an opening degree setting map prepared in advance based on an experiment or a simulation.

Through the process described above, fuel is supplied from the injector 25 to the fuel reformation chamber 23 while the air and the EGR gas are introduced into the fuel reformation chamber 23 of the fuel reformation cylinder 2. The fuel supply amount from the injector 25 is basically set according to the required engine power. Specifically, the valve opening period of the injector 25 is set so as to achieve a target fuel supply amount according to the fuel pressure in the injector 25. The opening timing of the injector 25 in this case is preferably set such that injection of the target fuel supply amount is completed by the time the air-intake stroke of the fuel reformation cylinder 2 is finished. However, the fuel injection period may be continued up to the middle of the compression stroke, if evenly mixed air-fuel mixture is obtainable before the piston 22 approaches the compression top dead point. This generates a homogeneous mixture (air-fuel mixture having a high equivalence ratio) in the fuel reformation chamber 23 before the piston 22 reaches the compression top dead point.

While the piston 22 moves toward the compression top dead point, the pressure and the temperature of the fuel reformation chamber 23 increase. In the fuel reformation chamber 23, the air-fuel mixture having a high equivalence ratio (e.g., air-fuel mixture having an equivalent ratio of 4.0 or more) is adiabatically compressed. As a result, the dehydrogenation reaction of the fuel, a partial oxidation reaction, a steam reforming reaction, and a thermal dissociation reaction take place under a high temperature and high pressure environment, thus reforming the fuel to generate reformed fuel having a high anti-knock property, such as hydrogen, carbon monoxide, and methane.

The reformed fuel discharged from the fuel reformation chamber 23 is cooled in the reformed fuel cooler 52 while the reformed fuel flows through the reformed fuel supply passage 51. With this cooling, preignition of the reformed fuel in the output cylinder air-intake passage 43 and the combustion chamber 33 is suppressed or reduced. The cooled reformed fuel is then mixed with the air flowing in the output cylinder air-intake passage 43 in the mixer 53, and is supplied to the combustion chamber 33 of the output cylinder 3. Further, the EGR gas amount adjusting valve 78 is opened as needed to introduce the EGR gas into the combustion chamber 33 of the output cylinder 3 through the output cylinder EGR passage 76.

Through the above process, the air, the reformed fuel, and the EGR gas are introduced into the combustion chamber 33 of the output cylinder 3, and the equivalence ratio in the combustion chamber 33 is adjusted to approximately 0.1 to 0.8.

In the compression stroke, the leaned mixed gas is adiabatically compressed in the output cylinder 3. When the piston 32 reaches the compression top dead point, a small amount of fuel is injected from the injector 35. This ignites the air-fuel mixture in the combustion chamber 33, and premixed combustion of the lean mixture is performed. In cases where the air-fuel mixture in the combustion chamber 33 is self-ignited (premixed compression self-ignition) without injection of the fuel from the injector 35, the injection of the fuel from the injector 35 is not necessarily required.

The above combustion reciprocates the piston 32 and rotates the crankshaft 11, thereby outputting an engine power. This engine power is transmitted to the screw shaft. Further, when the torque from the fuel reformation cylinder 2 is a negative value, the output from the output cylinder 3 is partially used as a drive source for reciprocation of the piston 22 in the fuel reformation cylinder 2.

Further, at a time of cold start of the internal combustion engine 1, a not-shown starter rotates (cranks) the crankshaft 11, and a predetermined amount of fuel is injected from the injectors 25, 35 of the fuel reformation cylinder 2 and the output cylinder 3, respectively. The fuel injection at this time is set so that the equivalence ratio in each of the fuel reformation chamber 23 and the combustion chamber 33 is less than 1. Through the above, compressed ignition combustion (usually, combustion equivalent to diesel combustion) takes place in each of the fuel reformation chamber 23 of the fuel reformation cylinder 2 and the combustion chamber 33 of the output cylinder 3. Then, when the warm-up of the fuel reformation cylinder 2 proceeds and the temperature reaches a temperature that enables the reforming reaction, the operation is switched to an operation for generating the reformed fuel (fuel reforming operation). As described above, the fuel reformation cylinder 2 can function as a cylinder for obtaining an engine power as in the case of the output cylinder 3, and can function as a fuel reformation device as hereinabove described.

At the time of stopping supply of the reformed fuel to the output cylinder 3 due to emergency stop and the like of the internal combustion engine 1, the bypass amount adjusting valve 82 is opened. This introduces the reformed fuel into the exhaust passage 61 via the output cylinder bypass passage 81, and stops supply of the reformed fuel to the output cylinder 3.

With this internal combustion engine 1, combustion (uniform lean combustion) of the lean mixture is performed in the output cylinder 3. The NOx emission amount and the soot discharge amount can therefore be reduced. Thus, it is possible to eliminate or significantly reduce the capacity of a post-processing apparatus for purifying exhaust gas. Further, since a fuel with a high anti-knock property is combusted, knocking is suppressed or reduced, and since diesel micro-pilot ignition enables combustion at a suitable timing, the combustion efficiency can be also improved.

—Reforming Reaction Possible Range—

The following describes a condition for enabling a reforming reaction in the fuel reformation chamber 23 of the fuel reformation cylinder 2. To enable the fuel reforming reaction, the equivalence ratio of the air-fuel mixture in the fuel reformation chamber 23 and the temperature of the fuel reformation chamber 23 (gas temperature) both need to be within a range that enables the reforming reaction. Further, the gas temperature required for causing the reforming reaction of the fuel is different depending on the equivalence ratio of the air-fuel mixture in the fuel reformation chamber 23. Therefore, to enable the fuel reforming reaction, the temperature of the fuel reformation chamber 23 needs to be a temperature (temperature which is equal to or higher than the lowest temperature that enables the reforming reaction) according to the equivalence ratio of the air-fuel mixture.

Figure 3:
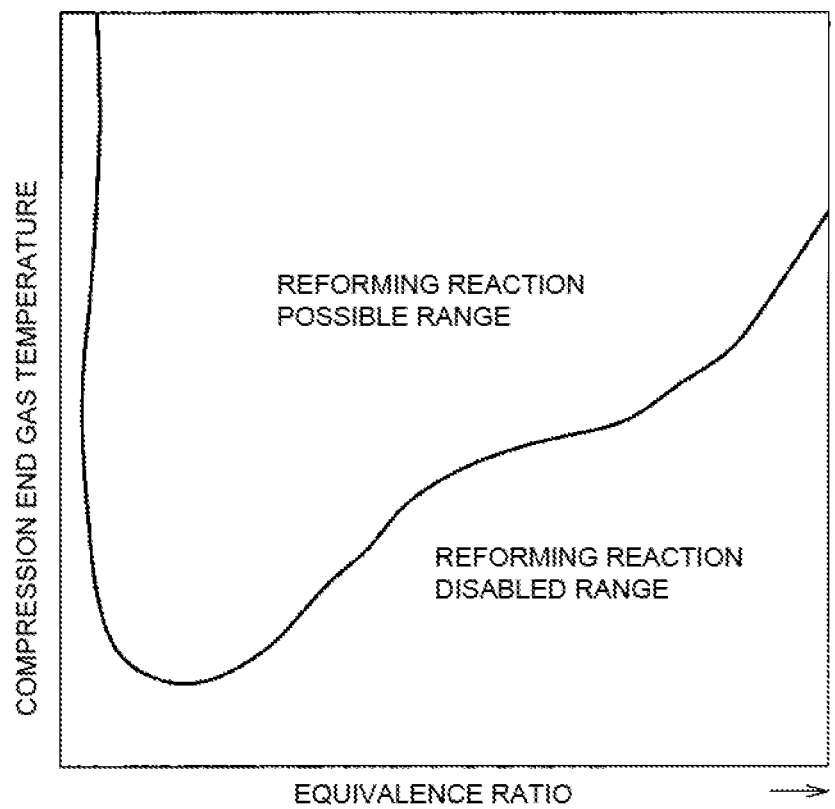
FIG. 3 A diagram showing the relationship among an equivalence ratio, a compression end gas temperature, and a reforming reaction possible range.

FIG. 3 is a diagram showing a relationship amongst an equivalence ratio of air-fuel mixture in the fuel reformation chamber 23 (horizontal axis), a gas temperature in the fuel reformation chamber 23 at a time point when the piston 22 reaches the compression top dead point in the fuel reformation cylinder 2 (hereinafter, compression end gas temperature; vertical axis), and the reforming reaction possible range. As shown in FIG. 3, to enable a reforming reaction in the fuel reformation chamber 23, an equivalent ratio of a predetermined value or more (e.g., 2 or more) is required as an equivalence ratio of the air-fuel mixture in the fuel reformation chamber 23, and the compression end gas temperature required for reforming reaction increases with an increase in the equivalence ratio. That is, to enable reforming reaction in the fuel reformation chamber 23, the compression end gas temperature needs to be increased with an increase in the equivalence ratio of the air-fuel mixture in the fuel reformation chamber 23.

—Output Adjusting Operation for Output Cylinder—

Next, the following describes an output adjusting operation for the output cylinder 3, which is a characteristic of the present embodiment. To generate reformed fuel in the fuel reformation chamber 23 as described above, the conversion efficiency can be increased by increasing the equivalence ratio in the fuel reformation chamber 23. However, increasing the equivalence ratio in the fuel reformation chamber 23 reduces the amount of the oxidation reaction (combustion amount) in the fuel reformation chamber 23. Since this oxidation reaction contributes to torque, reducing the amount of oxidation reaction by increasing the equivalence ratio leads to reduction in the torque (output) generated in the fuel reformation cylinder 2. Since the reforming reaction in the fuel reformation chamber 23 involves an endothermic reaction, the torque from the fuel reformation cylinder may be a negative value depending on the operating condition of the fuel reformation cylinder 2. That is, the fuel reformation cylinder 2 may be driven (the piston 22 is reciprocated) by the torque from the output cylinder 3. In such an operational state, the fuel reformation cylinder 2 needs to be driven while a required engine power according to a load or the like is satisfied. Therefore, a torque according to the required engine power needs to be output from the output cylinder 3.

Further, the reforming reaction in the fuel reforming cylinder 2 depends on the equivalence ratio and the gas temperature (particularly, a compression end gas temperature when the piston reaches the compression top dead point) in the fuel reformation cylinder 2, as is described hereinabove with reference to FIG. 3. When the equivalence ratio approaches (drops to) 1, an amount of the oxidation reaction increases, thus making the torque generated in the fuel reformation cylinder 2 a positive value. Further, the magnitude of the torque varies depending on the temperature conditions such as the gas temperature and the like, as well as the equivalence ratio. Therefore, in such an operational state, the torque output from the output cylinder 3 needs to be adjusted so that the output of the entire internal combustion engine (the sum of the output from the fuel reformation cylinder 2 and the output from the output cylinder 3) becomes the required engine power.

In view of this, in the present embodiment, An output adjusting operation is executed which evaluates an output from a fuel reformation cylinder 2 (more specifically, a net output from the fuel reformation cylinder 2, as is described later), and adjusts the output from the output cylinder 3 so that a sum of the output from the fuel reformation cylinder 2 and the output from the output from the output cylinder 3 (more specifically, a net output from the output cylinder 3, as described later) matches or substantially matches with the required engine power. The output adjusting operation is executed by the ECU 100. Therefore, the functional part of the ECU 100 that executes this output adjusting operation corresponds to the output adjustment unit described in the present invention.

This output adjusting operation is performed not only during a steady operation of the internal combustion engine 1 but also during a transient operation. The following describes an overview of the output adjusting operation.

(Output Adjusting Operation During Steady Operation)

As the output adjusting operation during a steady operation, an output calculating operation of the fuel reformation cylinder 2, and a target output calculating operation of the output cylinder 3 are sequentially performed. The following describes each of the operations.

Output Calculating Operation of Fuel Reformation Cylinder

First, the following describes the output calculating operation of the fuel reformation cylinder 2. The output calculating operation of the fuel reformation cylinder 2 is for calculating the net output of the fuel reformation cylinder 2. The net output is an integrated value of the workload per cycle of the fuel reformation cylinder 2, and is obtainable by subtracting the mechanical loss associated with driving of the fuel reformation cylinder 2 from the indicated horsepower of the fuel reformation cylinder 2.

The indicated horsepower of the fuel reformation cylinder 2 can be calculated based on the output signal from the cylinder internal pressure sensor 107 and the output signal from the crank position sensor 108 (corresponding to the output from the fuel reformation cylinder being evaluated based on a cylinder internal pressure of the fuel reformation cylinder and a rotational speed of the fuel reformation cylinder, of the present invention).

That is, the pressure in the fuel reformation chamber 23 is calculated based on the output signal from the cylinder internal pressure sensor 107. Further, a piston position of the fuel reformation cylinder 2 is evaluated based on the output signal from the crank position sensor 108. Then, from this piston position, the volume of the fuel reformation chamber 23 is geometrically calculated. The pressure inside the fuel reformation chamber 23 and the volume of the fuel reformation chamber 23 are sampled at every predetermined period, and these sampled values are applied to the known PV diagram. This way, the indicated horsepower per cycle of the fuel reformation cylinder 2 can be calculated.

A map for extracting the indicated horsepower of the fuel reformation cylinder 2 based on the sampled values of the pressure in the fuel reformation chamber 23 and the volume of the fuel reformation chamber 23 is stored in the ROM. Each sampled value is applied to the map to evaluate the indicated horsepower per cycle of the fuel reformation cylinder 2.

Further, the mechanical loss associated with the driving of the fuel reformation cylinder 2 can be evaluated according to the rotational speed of the fuel reformation cylinder 2 and the temperature of the fuel reformation cylinder 2. Specifically, an increase in the rotational speed of the fuel reformation cylinder 2 increases the friction resistance of each sliding part, and thus increasing the mechanical loss. Further, a drop in the temperature of the fuel reformation cylinder 2 increases the viscosity of the lubricant, for example, which leads to an increase in the mechanical loss. The rotational speed of the fuel reformation cylinder 2 can be calculated based the output signal from the crank position sensor 108. As the temperature of the fuel reformation cylinder 2, it is possible to use a cooling water temperature calculated based on an output signal from the water temperature sensor 106, or a taken-in gas temperature calculated based on an output signal from the taken-in gas temperature sensor 103, and the like. Thus, the relationship among the rotational speed of the fuel reformation cylinder 2, the temperature of the fuel reformation cylinder 2 (e.g., cooling water temperature), and the mechanical loss is evaluated by an experiment or a simulation. The mechanical loss is evaluated from the rotational speed of the current fuel reformation cylinder 2 and the temperature of the fuel reformation cylinder 2, and the output loss according to the mechanical loss is subtracted from the indicated horsepower to calculate the net output of the fuel reformation cylinder 2.

Further, the method of calculating a net output of the fuel reformation cylinder 2 is not limited to the above, and may be calculated based on a rotational speed (turning angle velocity) of the crankshaft 11 during a reforming reaction in the fuel reformation cylinder 2 (corresponds to the output from the fuel reformation cylinder being evaluated based on a rotational speed of the fuel reformation cylinder at a time when the reforming reaction takes place in the fuel reformation cylinder, of the present invention). That is, the rotational speed of the crankshaft 11 during the reforming reaction increases with an increase in the net output of the fuel reformation cylinder 2. Based on this relation, the net output of the fuel reformation cylinder 2 is calculated. For example, an average rotational speed of the crankshaft 11 for the piston 22 of the fuel reformation cylinder 2 to move from the compression top dead point to the bottom dead point (period of 180° in crank angle) is calculated as follows. Namely, the time required for the piston 22 of the fuel reformation cylinder 2 to move the compression top dead point to the bottom dead point is calculated based on the output signal from the crank position sensor 108, and this time is converted into the rotational speed of the crankshaft 11. Then, a relation between the average rotational speed calculated and the net output of the fuel reformation cylinder 2 is evaluated through an experiment or a simulation. The net output of the fuel reformation cylinder 2 is evaluated from the rotational speed of the crankshaft 11 at the current reforming reaction in the fuel reformation cylinder 2.

Alternatively, another method for calculating the net output of the fuel reformation cylinder 2 is to detect a torque generated in the crankshaft 11 at the time of reforming reaction in the fuel reformation cylinder 2, by a known torque sensor provided to the crankshaft 11.

Target Output Calculating Operation of Output Cylinder

Next, the following describes the target output calculating operation for the output cylinder 3. As described above, in the present embodiment, an output adjusting operation for adjusting an output from an output cylinder 3 is executed so that a sum of the output from the fuel reformation cylinder 2 and the output from the output cylinder 3 matches or substantially matches with a required engine power. To this end, the target output of the output cylinder 3 (the net output that should be output by a single output cylinder 3) can be calculated by defining the required engine power by the following formula (1), and converting the formula (1) into the following formula (2).

[Formula 1]

$$P_{out} = n_{powcyl} \cdot P_{powcyl} + n_{rfmcyl} \cdot P_{rfmcyl} \quad (1)$$

[Formula 2]

$$P_{powcyl} = \frac{P_{out} - n_{rfmcyl} \cdot P_{rfmcyl}}{n_{powcyl}} \quad (2)$$

In these formulas (1) and (2), $P_{out}$ is the required engine power; $n_{powcyl}$ is the number of output cylinders 3; $P_{powcyl}$ is the net output per output cylinder 3; $n_{rfmcyl}$ is the number of fuel reformation cylinders 2; and $P_{rfmcyl}$ is the net output per fuel reformation cylinder 2. The net output $P_{rfmcyl}$ per fuel reformation cylinder 2 can be obtained through the output calculating operation for the fuel reformation cylinder 2 described above.

The net output $P_{powcyl}$ per output cylinder 3 in formula (2) corresponds to the target output per output cylinder 3. As described, the net output $P_{powcyl}$ per output cylinder 3 is determined by subtracting the net output ($n_{rfmcyl}$, $P_{rfmcyl}$) of the fuel reformation cylinder 2 from the required engine power $P_{out}$, and dividing the value resulting from the subtraction by the number of output cylinders 3 $n_{powcyl}$.

As described above, the net output $P_{rfmcyl}$ per fuel reformation cylinder 2 may be a negative value. In this case, the net output $P_{powcyl}$ per output cylinder 3 calculated with the formula (2) will be a larger value as compared to a case where the net output $P_{rfmcyl}$ per fuel reformation cylinder 2 is zero or a positive value. That is, the net output $P_{powcyl}$ per output cylinder 3 (the target output per output cylinder 3) is calculated as a large value by an amount the output cylinder 3 serving as the drive source for the fuel reformation cylinder 2.

The net output $P_{powcyl}$ per output cylinder 3 (the net output that should be output by each output cylinder 3; target output) is calculated as described above, and the fuel supply amount is controlled to achieve this net output $P_{powcyl}$.

Examples of controlling the fuel supply amount to achieve the net output $P_{powcyl}$ of the output cylinder 3 include: control of the fuel supply amount from the injector 35 to the combustion chamber 33, and control of fuel supply amount from the injector 25 to the fuel reformation chamber 23.

In cases where the fuel supply amount from the injector 35 to the combustion chamber 33 is controlled, a relationship between a net output $P_{powcyl}$ per output cylinder 3 and the fuel supply amount from the injector 35 to the combustion chamber 33 is evaluated through an experiment or a simulation, and is stored as a map in the ROM. Referring to this map, the fuel supply amount to the output cylinder 3 is determined based on the net output $P_{powcyl}$ per output cylinder 3 (the target output per output cylinder 3). This way, an engine output can be stably obtained as a value nearby the required engine power, irrespective of the operational state of the fuel reformation cylinder 2.

In cases where the fuel supply amount from the injector 25 to the fuel reformation chamber 23 is controlled, a relationship between a net output $P_{powcyl}$ per output cylinder 3 and an amount of reformed fuel generated, and a relationship between the amount of reformed fuel generated and an amount of fuel supplied to the fuel reformation cylinder 2 are evaluated through an experiment or a simulation, and are each stored as a map in the ROM. Referring to these maps, the fuel supply amount to the fuel reformation cylinder 2 is determined based on the net output $P_{powcyl}$ per output cylinder 3 (the target output per output cylinder 3). This way, an engine output can be stably obtained as a value nearby the required engine power.

In this case, when the net output $P_{powcyl}$ per output cylinder 3 is changed (increased or decreased), the fuel supplied to the fuel reformation cylinder 2 is changed (increased or decreased). In other words, with the change in the supply fuel, the net output $P_{rfmcyl}$ per fuel reformation cylinder 2 may change. Therefore, the net output $P_{rfmcyl}$ per fuel reformation cylinder 2, which varies along with the change in the fuel supply, is evaluated through the output calculating operation described above, and while reflecting this value in the formula (2), the net output $P_{powcyl}$ per output cylinder 3 is calculated. This way, the net power $P_{powcyl}$ is converged to an appropriate value (the net output $P_{powcyl}$ for achieving the required engine power).

(Output Adjusting Operation During Transient Operation)

Next, the following describes the output adjusting operation at the time of transient operation. When a required engine power is changed (when the required engine power $P_{out}$ is changed) due to an increase in the engine load, interruption of the engine load, and the like, rapidly changing the net output of the fuel reformation cylinder 2 in response to the change may cause a sudden change in the rotational speed of the internal combustion engine 1 and may harm the stability of the operation. For this reason, in the present embodiment, when the required engine power is increased during the transient operation, for example, the fuel supply amount from the injector 35 to the combustion chamber 33 of each output cylinder 3 is first increased to increase the net output of the output cylinder 3 by an amount of increase in the required engine power. Then, the fuel supply amount from the injector 25 to the fuel reformation chamber 23 is gradually increased, and the fuel supply amount from the injector 35 to the combustion chamber 33 is gradually reduced. In other words, while the amount of reformed fuel generated in the fuel reformation chamber 23 is gradually increased, the amount of fuel directly supplied to each combustion chamber 33 is reduced. While achieving the net output of the output cylinder 3 (the net output corresponding to the change in the required engine power; the net output to match or substantially match the sum of the output from the fuel reformation cylinder 2 and the output from the output cylinder 3 with the required engine power) in this way, the heat source for achieving the net output of the output cylinder 3 is shifted from the fuel supplied from the injector 35 to the reformed fuel supplied from the fuel reformation chamber 23.

Figure 4:
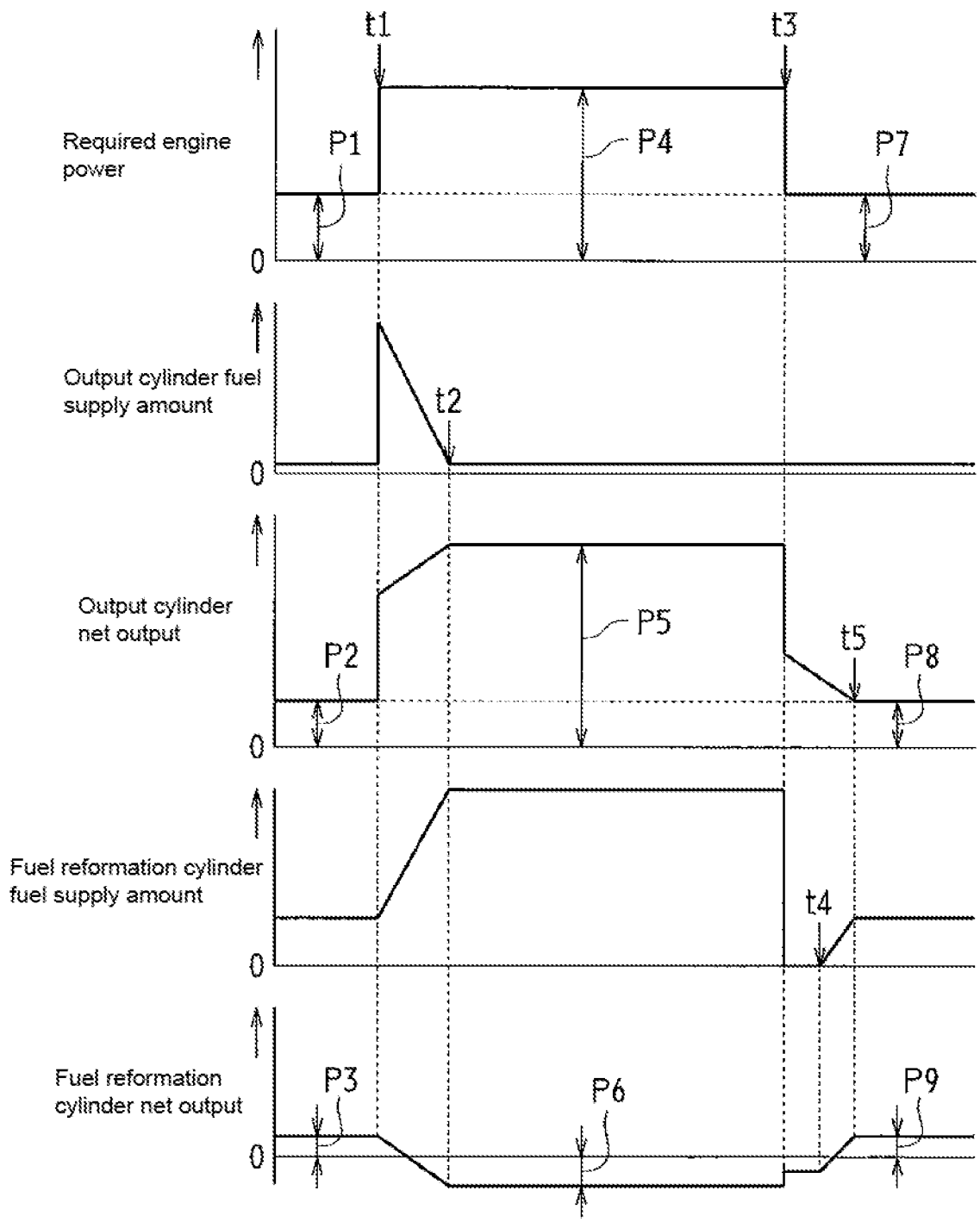
FIG. 4 A timing chart showing an example of changes in the required engine power, the fuel supply amount to the output cylinder, the net output of the output cylinder, the fuel supply amount to the fuel reformation cylinder, and the net output of the fuel reformation cylinder in an output adjusting operation during a transient operation.

For the sake of easier understanding of the output adjusting operation during a transient operation, the following describes an exemplary changes in the fuel supply amount to each cylinder and the net output from each cylinder, with reference to FIG. 4.

FIG. 4 is a timing chart showing an example of changes in the required engine power, the fuel supply amount to the output cylinder 3, the net output of the output cylinder 3, the fuel supply amount to the fuel reformation cylinder 2, and the net output of the fuel reformation cylinder 2 in an output adjusting operation during a transient operation. The net output of the output cylinder 3 in FIG. 4 is the sum of net output from each of the output cylinders 3.

FIG. 4 shows a transient operation in which the required engine power suddenly increases at the timing t1 in the figure, and the required engine power suddenly decreases at the timing t3 (returns to the state before the timing t1).

During the steady operation state before reaching the timing t1 in the figure, the net output of the output cylinder 3 and the net output of the fuel reformation cylinder 2 both have a positive value, and the sum of these net outputs is controlled to match with the required engine power. In other words, the sum of the net outputs P2 and P3 in the figure is controlled so as to match with the required engine power P1. At this time, a small amount of fuel is supplied in a fuel supply operation from the injector 35 to the combustion chamber 33. Further, in a fuel supply operation from the injector 25 to the fuel reformation chamber 23, an amount of fuel corresponding to the required engine power (a required engine power during the steady operation state) is supplied. The fuel supply amount from the injector 25 to the fuel reformation chamber 23 is adjusted based on the net output of the output cylinder 3 (the target output of the output cylinder 3), which is obtained in the output adjusting operation during the steady operation, using the formula (2) as described above. In this case, the net output P2 of the output cylinder 3 is reduced by the net output P3 of the fuel reformation cylinder 2, with respect to the required engine power P1.

When the required engine power suddenly increases at the timing t1 in the figure, the net output of the output cylinder 3 is also suddenly changed in response. In this case, the fuel supply amount from the injector 35 to the combustion chamber 33 is increased to increase the net output of the output cylinder 3, and the sum of the net output of the output cylinder 3 and the net output of the fuel reformation cylinder 2 is controlled to match with the required engine power. This way, the operation is stabilized while achieving the net output of the output cylinder 3 corresponding to the change in the required engine power.

Then, from the timing t1 to the timing t2, the fuel supply amount from the injector 25 to the fuel reformation chamber 23 is gradually increased, and the fuel supply amount from the injector 35 to the combustion chamber 33 is gradually reduced. In other words, while the amount of reformed fuel generated in the fuel reformation chamber 23 is gradually increased, the amount of fuel directly supplied to each combustion chamber 33 is reduced. While achieving the net output of the output cylinder 3 (the net output corresponding to the change in the required engine power; the net output to match or substantially match the sum of the output from the fuel reformation cylinder 2 and the output from the output cylinder 3 with the required engine power) in this way, the heat source for achieving the net output of the output cylinder 3 is shifted from the fuel supplied from the injector 35 to the reformed fuel supplied from the fuel reformation chamber 23. At this time, the variation amount per unit time in the fuel supply amount from each of the injectors 25, 35 is kept constant, and the state where the sum of the net output of the output cylinder 3 and the net output of the fuel reformation cylinder 2 matches with the required engine power is maintained.

At the timing t2, the net output of the output cylinder 3 is a positive value, whereas the net output of the fuel reformation cylinder 2 is a negative value. In this case too, the sum of the net output is controlled to match with the required engine power. In other words, a small amount of fuel is supplied in a fuel supply operation from the injector 35 to the combustion chamber 33. Further, in a fuel supply operation from the injector 25 to the fuel reformation chamber 23, an amount of fuel corresponding to the required engine power (a required engine power after the change) is supplied. This way, the difference between the net outputs P5 and P6 in the figure is controlled so as to match with the required engine power P4. Therefore, the net output P5 of the output cylinder 3 is increased by the net output P6 of the fuel reformation cylinder 2, with respect to the required engine power P4.

When the required engine power suddenly drops at the timing t3 in the figure, the net output of the output cylinder 3 is also suddenly changed in response. In this case, the fuel supply amount from the injector 35 to the combustion chamber 33 is maintained small as described above, and the fuel supply amount from the injector 25 to the fuel reformation chamber 23 temporarily set to zero. This way, the reformed fuel remaining in the reformed fuel supply system 5 is introduced into the combustion chamber 33, thereby gradually changing the net output of the output cylinder 3 to a value corresponding to the required engine power after the change.

Then, from the timing t4 to the timing t5, the fuel supply from the injector 25 to the fuel reformation chamber 23 is started, to resume generation of the reformed fuel. This reformed fuel is supplied to the combustion chamber 33 and combusted to achieve the net output of the output cylinder 3. At this time, the variation amount per unit time in the fuel supply amount from the injector 25 is kept constant.

Then, in the operation from and after the timing t5, an amount of fuel according to the required engine power is supplied from the injector 25 to the fuel reformation chamber 23. In the operation from and after the timing t5, the sum of the net outputs P8 and P9 in the figure matches with the required engine power P7, as in the steady operation state before reaching the timing t1 described above.

—Output Adjusting Operation for Output Cylinder—

Figure 5:
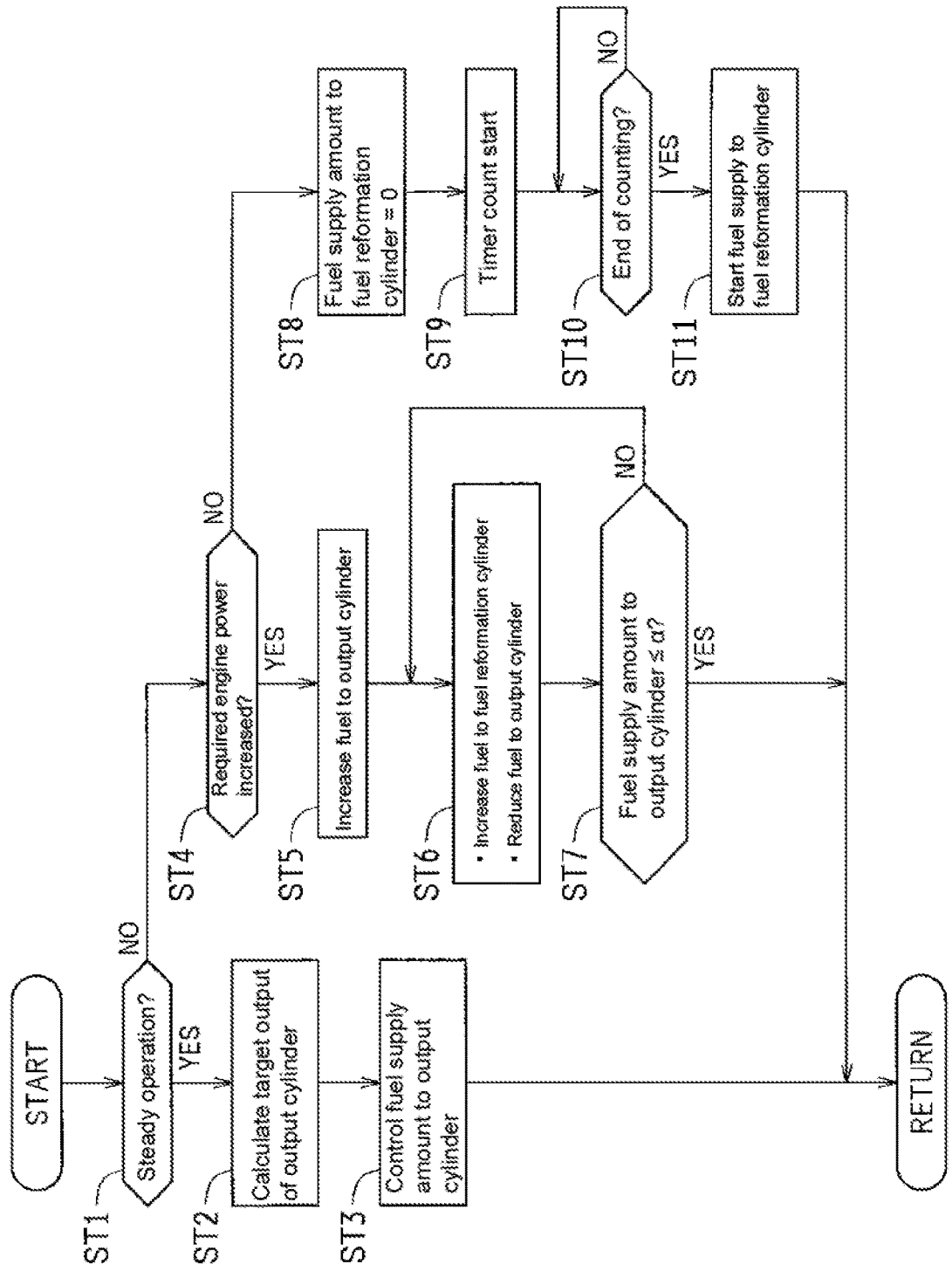
FIG. 5 A flowchart showing a procedure for the output adjusting operation.

Next, the following describes, with reference to the flowchart of FIG. 5, an output adjusting operation for the output cylinder 3, which is a characteristic of the present embodiment. This flowchart is executed, for example, every 1 cycle of the fuel reformation cylinder 2 in the ECU 100, after starting of the internal combustion engine 1.

First, in the step ST1, whether or not the operation mode of the internal combustion engine 1 is in the steady operation is determined. This step determines whether or not the amount of change in the engine load is larger than a predetermined load variation threshold value. For example, whether or not the variation amount in the throttle opening degree of the ship is larger than a predetermined threshold value is determined.

If the amount of change in the engine load is not more than the load variation threshold value, and the internal combustion engine 1 is in the steady operation (YES in the step ST1), the process proceeds to the step ST2 to calculates a target output of the output cylinder 3 (the net output that the output cylinder 3 should output) using the above described formula (2). That is, the above-described output calculating operation of the fuel reformation cylinder 2 and the target output calculating operation for the output cylinder 3 are executed.

Then, the process proceeds to the step ST3, the fuel supply amount to the output cylinder 3 is controlled to achieve the target output of the output cylinder 3 (to match the sum of the net output of the output cylinder 3 and the net output of the fuel reformation cylinder 2 with the required engine power). Alternatively, as described above, the fuel supply amount to the fuel reformation cylinder 2 is controlled. As described above, the target output of the output cylinder 3 calculated by using the formula (2) is determined so that a sum of the output from the fuel reformation cylinder 2 and the output from the output cylinder 3 matches or substantially matches with a required engine power. Therefore, with the control of the fuel supply amount, an engine output can be stably obtained as a value nearby the required engine power.

If the amount of change in the engine load is more than the load variation threshold value, and the internal combustion engine 1 is in the transient operation (NO in the step ST1), the process proceeds to the step ST4 to determine whether the change in the engine load causes an increase in the required engine power. More specifically, for example, whether or not the throttle opening degree of the ship is increased and the engine load is increased is determined.

If the change in the engine load is determined as to cause an increase in the required engine power, and the step ST4 results in YES, the process proceeds to the step ST5 to increase the amount of fuel supplied from the injector 35 to the output cylinder 3. That is, the fuel supply operation at the timing t1 in FIG. 4 is executed. In other words, the fuel supply amount from the injector 35 to the combustion chamber 33 is increased to increase the net output of the output cylinder 3, and the sum of the net output of the output cylinder 3 and the net output of the fuel reformation cylinder 2 is controlled to match with the required engine power.

Then, the process proceeds to the step ST6 to increase the amount of fuel supplied to from the injector 25 to the fuel reformation cylinder 2, and reduce the amount of fuel supplied from the injector 35 to the output cylinder 3. That is, the fuel supply operation of the period from the timing t1 to the timing t2 in FIG. 4 is executed. In other words, the heat source for achieving the net output of the output cylinder 3 is shifted from the fuel supplied from the injector 35 to the reformed fuel supplied from the fuel reformation chamber 23.

After the fuel supply operation is started, the process proceeds to the step ST7 to determine whether or not the fuel supply amount from the injector 35 to the output cylinder 3 has dropped to a predetermined amount a or less. This predetermined amount a corresponds to the small fuel supply amount for igniting the air-fuel mixture in the combustion chamber 33 described above.

If the fuel supply amount from the injector 35 to the output cylinder 3 has not yet dropped to the predetermined amount a or less (surpasses the predetermined amount a) and the step ST7 results in NO, the process returns to the step ST6 to further increase the amount of fuel supplied to from the injector 25 to the fuel reformation cylinder 2, and further reduce the amount of fuel supplied from the injector 35 to the output cylinder 3.

If the fuel supply amount from the injector 35 to the output cylinder 3 has dropped to the predetermined amount a and the step ST7 results in YES, the process is returned with the current fuel supply amount maintained. This state corresponds to the period from the timing t2 to the timing t3 in FIG. 4.

If the step ST4 results in NO, i.e., the change in the engine load is determined as to cause a decrease in the required engine power, the process proceeds to the step ST8 to set the amount of fuel supplied from the injector 25 to the fuel reformation cylinder 2 to zero. That is, the fuel supply operation at the timing t3 in FIG. 4 is executed.

From a point of setting the fuel supplied amount to the fuel reformation cylinder 2 to zero as described, counting by a timer stored in advance in the ECU 100 is started in the step ST9. For example, this timer ends the counting (time is up) upon elapse of a period required for substantially all the remaining reformed fuel in the reformed fuel supply system 5 to be introduced to the combustion chamber 33. This period is set in advance through an experiment or a simulation. This state corresponds to the period from the timing t3 to the timing t4 in FIG. 4.

In step ST10, whether or not the counting by the timer has ended (whether or not substantially all of the reformed fuel remaining in the reformed fuel supply system 5 has been introduced to the combustion chamber 33) is determined. If the counting by the timer has not yet been completed, the counting by the timer is continued.

On the other hand, when the counting by the timer is completed and the step ST10 results in YES, the process proceeds to the step ST11 to start the fuel supply from the injector 25 to the fuel reformation cylinder 2. In other words, the injector 25 is controlled so that an amount of fuel corresponding to the current required engine power is supplied to the fuel reformation chamber 23. That is, the fuel supply operation at the timing t4 in FIG. 4 is executed.

By repeating the above operation, the operation of the step ST2 and the step ST3, the operations of the step ST5 and the step ST6, and the operation of the step ST11 correspond to an operation by the output adjustment unit of the present invention in which "an output from the fuel reformation cylinder is evaluated, and an output adjusting operation is executed to adjust an output from the output cylinder so that a sum of the output from the fuel reformation cylinder and the output from the output cylinder matches or substantially matches with a required engine power".

The control of the fuel reforming operation is executed by the ECU 100. Therefore, the functional part of the ECU 100 that executes this control corresponds to the control device described in the present invention. Further, a method of control executed by the ECU 100 corresponds to a control method referred to in the present invention.

As described hereinabove, in the present embodiment, when the output from the fuel reformation cylinder 2 is a negative value, i.e., in a state where the fuel reformation cylinder 2 is driven by the output from the output cylinder 3, the output adjustment unit increases the output from the output cylinder 3 by that amount (the amount of output required for driving the fuel reformation cylinder 2). To the contrary, when the output from the fuel reformation cylinder 2 is a positive value, i.e., in a state where the output from the fuel reformation cylinder 2 contributes to the required engine power, the output from the output cylinder 3 is reduced by that amount (an amount of output of the fuel reformation cylinder 2). Thus, the sum of the output from the fuel reformation cylinder 2 and the output from the output cylinder 3 can be matched or substantially matched with the required engine power. As a result, an engine output can be stably obtained as a value nearby the required engine power, irrespective of the operational state of the fuel reformation cylinder 2.

—Control of Fuel Reformation Cylinder—

When the output adjusting operation described above is executed, the reforming reaction preferably takes place normally in the fuel reformation cylinder 2. For example, when controlling the fuel supply amount from the injector 25 to the fuel reformation chamber 23 to match or substantially match the sum of an output from the output cylinder 3 and an output from the fuel reformation cylinder 2 with the required engine power, it will be difficult to match the sum of the outputs with the required engine power, if the reforming reaction in the fuel reformation cylinder 2 does not normally take place. For this reason, it is preferable that the reforming reaction normally takes place.

In view of this, in the present embodiment, whether or not the reforming reaction normally takes place in the fuel reformation cylinder 2 is determined. If the reforming reaction is not determined as to take place, control for causing the reforming reaction to normally take place (reforming reaction promoting operation of the present invention) is executed. The reforming reaction promoting operation is executed by the ECU 100. Therefore, the functional part of the ECU 100 that executes this reforming reaction promoting operation corresponds to the reforming reaction promoting unit described in the present invention.

To determine whether or not the reforming reaction normally takes place, an expected output during the reforming reaction in the fuel reformation cylinder 2 (output assuming that the reforming reaction is normally taking place) is set in advance, and this expected output and the actual output are compared. When the actual output is lower than the expected output and the difference is equal to or larger than a predetermined value, it is determined that the reforming reaction is not favorably taking place in the fuel reformation cylinder 2.

Specifically, the expected output of the fuel reformation cylinder 2 is calculated according to the following formula (3).

[Formula 3]

$$P_{ept}=f(\Psi_i, g_{in}, g_{fuel}) \quad (3)$$

In this formula (3), $P_{ept}$ is the expected output of the fuel reformation cylinders 2; $\Psi_i$ is a variable based on the composition of the taken-in gas (e.g., the mole fraction of each gas component); $g_{in}$ is an amount of taken-in gas introduced to the fuel reformation chamber 23; and $g_{fuel}$ is an amount of fuel supplied to the fuel reformation chamber 23. In other words, this formula (3) is an arithmetic expression using an amount of taken-in gas or the like as a variable, and is created based on an experiment or a simulation.

Further, the level of influence of each factor may be grasped in advance by an element test or the like, and the expected output $P_{ept}$ of the fuel reformation cylinder 2 may be evaluated based on a map or the like.

At a time of comparing the expected output $P_{ept}$ of the fuel reformation cylinder 2 with the actual output of the fuel reformation cylinder 2 (corresponding to the net output) $P_{rfmcyl}$, when the difference between them is equal to or larger than a predetermined value taking into an account a measurement error, it is determined that the reforming reaction is not favorably taking place in the fuel reformation cylinder 2.

Specifically, the expected output lower limit value $P_{ept\_\#\_Low}$ is set in advance. The reforming reaction in the fuel reformation cylinder 2 is determined as not to be favorably taking place, when the actual output $P_{rfmcyl}$ of the fuel reformation cylinder 2 is below the expected output lower limit value $P_{ept\_\#\_Low}$.

The expected output lower limit value $P_{ept\_\#\_Low}$ may be set as a value that is a predetermined amount lower than the expected output $P_{ept}$ (see the following expression (4)), or calculated from the operational state of the internal combustion engine 1 (see the following equation (5)).

[Formula 4]

$$P_{ept\_Low}=P_{ept}-\Delta P_{ept} \quad (4)$$

[Formula 5]

$$P_{ept\_Low}=f(\Psi_i, g_{in}, g_{fuel}) \quad (5)$$

When the reforming reaction in the fuel reformation cylinder 2 is determined as not to be favorably taking place, example of measure to cause a favorable reforming reaction include increasing of the compression end gas temperature, and lowering of the equivalence ratio of the fuel reformation chamber 23. That is, as described above, since the reforming reaction in the fuel reforming cylinder 2 depends on the equivalence ratio and the compression end gas temperature of the fuel reformation cylinder 2, these parameters are adjusted in a direction to cause a favorable reforming reaction.

The actual compression end gas temperature in the fuel reformation chamber 23 can be calculated (estimated) by the following formula (6).

[Formula 6]

$$T_{TDC}=C_{react} \cdot T_{ini} \cdot \varepsilon^{\kappa-1} \quad (6)$$

In the formula (1), $T_{TDC}$ is the compression end gas temperature, $T_{ini}$ is the gas temperature before the compression; i.e., the taken-in gas temperature, $\varepsilon$ is the effective compression ratio of the fuel reformation cylinder 2, $\kappa$ is the polytropic number of the taken-in gas in the fuel reformation chamber 23, and $C_{react}$ is a correction coefficient taking into consideration an increase in the temperature associated with a reforming reaction (in particular, partial oxidation reaction) in the fuel reformation chamber 23 (an increase in the temperature due to a reforming reaction when the piston 22 reaches the compression top dead point).

By correcting the parameters in the formula (6) are adjusted in a direction to cause a favorable reforming reaction by increasing the compression end gas temperature $T_{TDC}$. For example, the opening degree of the bypass amount adjusting valve 75 is increased to increase the EGR gas amount bypassing the EGR gas cooler 72, thereby raising the gas temperature $T_{ini}$ before compression. Further, the variable valve unit 28 is controlled to shift the closing timing of the air-intake valve 26 to the bottom dead point side, thereby increasing the effective compression ratio of the fuel reformation cylinder 2. Further, the cooling water temperature and the equivalence ratio in the fuel reformation chamber 23 are varied to increase the polytropic number $\kappa$ of the intake-gas. Further, the oxygen concentration in the fuel reformation chamber 23 is increased to increase the temperature rise $C_{react}$ associated with the reforming reaction.

Further, the opening degree of the air-intake amount adjust valve 45 is increased while reducing the opening degree of the EGR gas amount adjusting valve 73 to increase the amount of oxygen in the fuel reformation chamber 23, thereby bringing the equivalence ratio of the fuel reformation chamber 23 close to 1. Further, the opening degree of the bypass amount adjusting valve 75 is reduced to reduce the EGR gas amount bypassing the EGR gas cooler 72 and lowering the temperature of the taken-in gas introduced to the fuel reformation chamber 23, so that an oxygen filling efficiency is increased, and the equivalence ratio in the fuel reformation chamber 23 is brought close to 1.

By these operations, the reforming reaction can be improved. This enables the favorable control of the fuel supply amount from the injector 25 to the fuel reformation chamber 23 to match or substantially match the sum of an output from the output cylinder 3 and an output from the fuel reformation cylinder 2 with the required engine power.

Other Embodiments

Note that the above embodiment is illustrative in all respects, and is not intended to be a basis for limiting interpretation. Accordingly, the scope of the present invention is not to be interpreted solely by the foregoing embodiments, but is defined based on the description of the appended claims. Further, the technical scope of the present invention includes all changes within the meaning and scope of the appended claims.

For example, the above embodiment deals with a case where the present invention is applied to an internal combustion engine 1 for a ship, but the present invention is also applicable to an internal combustion engine in other applications (e.g., an electric power generator, a vehicle, and the like).

Further, the above embodiment deals with a case where the injectors 25, 35 of the cylinders 2, 3 are direct injection type which directly inject fuel into the cylinders. The present invention is not limited to this, and either or both of the injectors 25, 35 may be of a port injection type.

Further, the above embodiment deals with a case where the fuel to be supplied to the fuel reformation chamber 23 is light oil. The present invention is not limited to this, and the fuel may be heavy oil, gasoline, or the like.

In addition, the above embodiment deals with a case where the fuel reformation cylinder 2 and the output cylinder 3 are operated at the same rotational speed. The present invention is not limited to this, and the speed reducer may be interposed between the cylinders 2, 3 (to the crankshaft 11 between the cylinders 2, 3), and the rotational speed of the fuel reformation cylinder 2 may be lower than the rotational speed of the output cylinder 3.

Further, in the above embodiment, during the transient operation in which the required engine power is rapidly increased, the net output of the output cylinder 3 is rapidly changed. Then, immediately after that, Then, the fuel supply amount from the injector 25 to the fuel reformation chamber 23 is gradually increased, and the fuel supply amount from the injector 35 to the combustion chamber 33 is gradually reduced. The present invention however is not limited to this. The net output of the output cylinder 3 may be rapidly changed, and this state may be maintained for a predetermined period. Then, the fuel supply amount from the injector 25 to the fuel reformation chamber 23 may be gradually increased, and the fuel supply amount from the injector 35 to the combustion chamber 33 may be gradually reduced.

It should be noted that the present invention may be embodied in various other forms without departing from the spirit or essential characteristics thereof. Therefore, each of the embodiments described above and each of the embodiments described above are merely exemplary, and should not be construed as limiting the scope of the present invention. The scope of the present invention is indicated by the appended claims and is not to be limited in any way by the text of the specification. Further, the scope of the present invention encompasses all changes and modifications falling within the scope of the appended claims.

This application claims priority from Japanese Patent Application No. 2016-139576, filed in Japan on Jul. 14, 2016. The entire content of the application is hereby incorporated in the present application by reference. The entire contents of the documents cited herein are hereby incorporated in the present application by reference.

INDUSTRIAL APPLICABILITY

The present invention is applicable to control of an internal combustion engine including a fuel reformation cylinder and an output cylinder.

REFERENCE SIGNS LIST 1 internal combustion engine
2 fuel reformation cylinder (fuel reformation device)
3 output cylinder
25, 35 injector
100 ECU
107 cylinder internal pressure sensor
108 crank position sensor

The invention claimed is:

1. A control device for an internal combustion engine including a fuel reformation cylinder and one or more output cylinders to which a reformed fuel generated in the fuel reformation cylinder is supplied, the one or more output cylinders each being configured to yield an engine power by combusting the reformed fuel, the control device comprising:
an output adjustment unit configured to:
evaluate an output from the fuel reformation cylinder; and
execute an output adjusting operation to adjust an output from the one or more output cylinders so that a sum of the output from the fuel reformation cylinder and the output from the one or more output cylinders matches a required engine power; and
wherein:
each cylinder of the fuel reformation cylinder and the one or more output cylinders has an injector configured to supply fuel into the respective cylinder; and
during a transient operation in which the required engine power is increased, the output adjustment unit is further configured to increase a fuel supply amount to the one or more output cylinders from its injector to increase the output from the one or more output cylinders, so that a sum of output from the one or more output cylinders and the output from the fuel reformation cylinder matches the required engine power, and then gradually increase the fuel supply amount from the injector to the fuel reformation cylinder while gradually reducing the fuel supply amount to the one or more output cylinders from its injector, so as to maintain a state in which the sum of the output from the one or more output cylinders and the output from the fuel reformation cylinder matches the required engine power.

2. The control device according to claim 1, wherein:
the output adjustment unit is configured to:
subtract the output from the fuel reformation cylinder from the required engine power,
divide a value resulting from the subtraction by a number of the one or more output cylinders to determine a target output for each of the output cylinders, and
execute the output adjusting operation so as to obtain the target output.

3. The control device according to claim 1, wherein the output from the fuel reformation cylinder is evaluated based on:
a cylinder internal pressure of the fuel reformation cylinder and a rotational speed of an engine comprising the fuel reforming cylinder, or
a rotational speed of the engine comprising the fuel reformation cylinder at a time of executing a reforming reaction in the fuel reformation cylinder.

4. The control device according to claim 1, further comprising
a reforming reaction promoting unit configured to execute a reforming reaction promoting operation for promoting reforming reaction, when the output from the fuel reformation cylinder is a predetermined amount or more below a threshold output.

5. The control device according to claim 4, wherein:
the reforming reaction promoting operation by the reforming reaction promoting unit brings an equivalence ratio in the fuel reformation cylinder to toward a value of one or raises a gas temperature in the fuel reformation cylinder.

6. A control method for an internal combustion engine including a fuel reformation cylinder and an output cylinder to which reformed fuel generated in the fuel reformation cylinder is supplied, the output cylinder being configured to yield an engine power by combusting the reformed fuel, the method comprising:
evaluating an output from the fuel reformation cylinder,
executing an output adjusting operation to adjust an output from the output cylinder so that a sum of the output from the fuel reformation cylinder and the output from the output cylinder matches a required engine power; and
during a transient operation in which the required engine power is increased:
increasing a fuel supply amount to the output cylinder from a first injector to increase the output from the output cylinder, so that a sum of output from the output cylinder and the output from the fuel reformation cylinder is equal to the required engine power, and
gradually increasing the fuel supply amount from a second injector to the fuel reformation cylinder while gradually reducing the fuel supply amount to the output cylinder from the first injector, so as to maintain a state in which the sum of the output from the output cylinder and the output from the fuel reformation cylinder is equal to the required engine power.

7. The method of claim 6, wherein the output from the fuel reformation cylinder is evaluated based on a cylinder internal pressure of the fuel reformation cylinder and a rotational speed of an engine comprising the fuel reformation cylinder.

8. The method of claim 6, wherein the output from the fuel reformation cylinder is evaluated based on a rotational speed of an engine comprising the fuel reformation cylinder at a time of executing a reforming reaction in the fuel reformation cylinder.

9. The method of claim 6, further comprising:
determining a target output for the output cylinder; and
executing the output adjusting operation to obtain the target output.

10. The method of claim 6, further comprising executing a reforming reaction promoting operation for promoting a reforming reaction, when the output from the fuel reformation cylinder is less than or equal to a threshold output.

11. The method of claim 10, wherein the reforming reaction promoting operation comprises decreasing an equivalence ratio in the fuel reformation cylinder to be less than or equal to 1.5.

12. The method of claim 10, wherein the reforming reaction promoting operation comprises increasing a gas temperature in the fuel reformation cylinder.

13. A system for controlling an internal combustion engine, the system comprising:
an engine control unit ("ECU") configured to:
determine an output of a fuel reformation cylinder, the fuel reformation cylinder configured to supply reformed fuel to one or more output cylinders;
calculate a difference of a required engine power and the output from the fuel reformation cylinder;
divide the difference by a number of the one or more output cylinders to determine a target output for each output cylinder; and
adjust an output of the one or more output cylinders to the target output such that the internal combustion engine operates in a first state, in which a sum of the output of the fuel reformation cylinder and the output of the one or more output cylinders is equal to the required engine power.

14. The system of claim 13, wherein the ECU is configured to:
adjust a first fuel supply amount of a first injector that is configured to supply fuel to the fuel reformation cylinder; and
adjust a second fuel supply amount of one or more second injectors that are each configured to supply fuel to a respective one of the one or more output cylinders.

15. The system of claim 14, wherein, during a transient operation in which the required engine power is increased, the ECU is configured to:
increase the second fuel supply amount to increase the output from the one or more output cylinders, such that the internal combustion engine is in the first state; and
increase the first fuel supply amount while reducing the second fuel supply amount such that the internal combustion engine remains in the first state.

16. The system of claim 15, wherein the output from the fuel reformation cylinder is determined based on a cylinder internal pressure of the fuel reformation cylinder and a rotational speed of an engine comprising the fuel reforming cylinder.

17. The system of claim 15, wherein the output from the fuel reformation cylinder is evaluated based on a rotational speed of an engine comprising the fuel reformation cylinder at a time of executing a reforming reaction in the fuel reformation cylinder.

18. The system of claim 13, wherein, based on the output from the fuel reformation cylinder is less than or equal to a threshold output, the ECU is further configured to:
- adjust an equivalence ratio in the fuel reformation cylinder toward a value of one; or
- increase a gas temperature in the fuel reformation cylinder.

19. The system of claim 13, further comprising an engine having a plurality of cylinders each configured to house a respective reciprocation type piston, the plurality of cylinders comprising the fuel reformation cylinder and one or more output cylinders.

\* \* \* \* \*